United States Patent
Farrell et al.

(10) Patent No.: US 8,071,698 B2
(45) Date of Patent: Dec. 6, 2011

(54) SURFACE-PROMOTED CURE OF CATIONICALLY CURABLE COMPOSITIONS COMPRISING VINYL ETHERS

(75) Inventors: David Farrell, Kingswood (IE); Ciaran B. McArdle, Dublin (IE); Michael Doherty, Donegal (IE)

(73) Assignee: Loctite (R&D) Limited, Dublin (IE)

( * ) Notice: Subject to any disclaimer, the term of this patent is extended or adjusted under 35 U.S.C. 154(b) by 256 days.

(21) Appl. No.: 12/470,900

(22) Filed: May 22, 2009

(65) Prior Publication Data
US 2009/0288769 A1 Nov. 26, 2009

Related U.S. Application Data

(60) Provisional application No. 61/055,540, filed on May 23, 2008.

(51) Int. Cl.
- C09J 163/00 (2006.01)
- C08L 63/00 (2006.01)
- C08L 67/06 (2006.01)
- C09K 3/00 (2006.01)

(52) U.S. Cl. ........ 525/533; 525/523; 525/451; 156/330; 252/182.18

(58) Field of Classification Search .............. 525/533, 525/523, 451; 156/330; 252/182.18
See application file for complete search history.

(56) References Cited

U.S. PATENT DOCUMENTS

| | | | |
|---|---|---|---|
| 2,628,178 A | 2/1953 | Burnett et al. | |
| 2,895,950 A | 7/1959 | Krieble et al. | |
| 3,218,305 A | 11/1965 | Krieble et al. | |
| 3,435,012 A | 3/1969 | Nordlander | |
| 5,369,139 A | 11/1994 | Boeckeler et al. | |
| 5,739,232 A | 4/1998 | Hazell et al. | |
| 7,210,763 B2 * | 5/2007 | Kato et al | 347/45 |
| 2006/0167127 A1 * | 7/2006 | Nguyen et al. | 522/81 |

FOREIGN PATENT DOCUMENTS

JP 57180618 11/1982

OTHER PUBLICATIONS

J.V. Crivello et al., "Redox Cationic Polymerization: The Diaryliodonium Salt/Ascorbate Redox Couple", *J. Polym. Sci.*, 19, pp. 539-548 (1981).

J.V. Crivello et al., Redox-Initiated Cationic Polymerization: The Diaryliodonium Salt/Benzoin Redox Couple, *J. Polym. Sci.*, 21, pp. 1097-1110 (1983).

J. Collomb et al., "Cationic Polymerization Induced by Metal Salts-I", *European Poly. J.*, vol. 16, pp. 1135-1144 (1980).

J. Collomb et al., "Cationic Polymerisation Induced by Metal Salts 2a). A Preliminary Communication on Homogeneous Systems", *Makromol. Chem. Rapid Commun.*, 1, pp. 489-491 (1980).

P. Castell et al., "Study of lanthanide Triflates as New Curing Initiators for DGEBA", *Polymer 41*, pp. 8465-8474 (2000).

J.V. Crivello and J. L. Lee, *Makromol. Chem.*, 184, 463-473 (1983).

Holtzclaw, H.F.; Robinson, W.R.; Odom, J.D.; General Chemistry, 1991, 9th Ed., Heath (Pub.), p. 44.

S. Moane et al., "Decomposition of Peroxides by Transition Metal Ions in Anaerobic Adhesive Cure Chemistry", *Int. J. Adh. & Adh.*, 19, pp. 49-57 (1999).

Rich, R.; Handbook of Adhesive Technology ed. Pizzi, A. & Mittal, K.L., Marcel Dekker (Pubs.), Chap. 29, pp. 467-479 (1994).

M.S. Kharash et al., "The Chemistry of Hydroperoxides. XI. Hydroperoxides as Oxiding and Reducing Agents", *J. Org. Chem.*, vol. 17, pp. 207-220 (1952).

Haviland, G.S.; "Machinery Adhesives for Locking Retaining & Sealing", (1986).

International Search Report issued against International Patent Application No. PCT/EP2009/056256 mailed on Aug. 5, 2009.

* cited by examiner

Primary Examiner — William Cheung
(74) Attorney, Agent, or Firm — Steven C. Bauman

(57) ABSTRACT

The present invention relates to cationically curable compositions for curing on a surface comprising a cationically curable component, an accelerator species comprising at least one vinyl ether functional group and an initiator component capable of initiating cure of the cationically curable component. The initiator comprises at least one metal salt, which is chosen so that it is reduced at the surface, and where the standard reduction potential of the initiator component is greater than the standard reduction potential of the surface, and where when the composition is placed in contact with the surface, the metal salt of the initiator component of the composition is reduced at the surface, thereby initiating cure of the cationically curable component of the composition. The accelerator species comprising at least one vinyl ether functional group greatly enhances the rate of cure. No catalytic component is required in the composition for efficient cure.

16 Claims, No Drawings

SURFACE-PROMOTED CURE OF CATIONICALLY CURABLE COMPOSITIONS COMPRISING VINYL ETHERS

FIELD OF THE INVENTION

The present invention relates to stable one-part cationically curable compositions for curing on a surface.

DISCUSSION OF BACKGROUND ART

Reduction-Oxidation (RedOx) Cationic Polymerisation

RedOx cationic polymerizations involve oxidation and reduction processes [Holtzclaw, H. F.; Robinson, W. R.; Odom, J. D.; *General Chemistry*, 1991, 9th Ed., Heath (Pub.), p. 44]. When an atom, either free or in a molecule or ion, loses an electron or electrons, it is oxidised and its oxidation number increases. When an atom, either free or in a molecule or ion, gains an electron or electrons, it is reduced and its oxidation number decreases. Oxidation and reduction always occur simultaneously, as if one atom gains electrons then another atom must provide the electrons and be oxidised. In a RedOx couple, one species acts as a reducing agent, the other as an oxidizing agent. When a RedOx reaction occurs the reducing agent gives up or donates electrons to another reactant, which it causes to be reduced. Therefore the reducing agent is itself oxidised because it has lost electrons. The oxidising agent accepts or gains electrons and causes the reducing agent to be oxidised while it is itself reduced. A comparison of the relative oxidising or reducing strengths of strength of the two reagents in a RedOx couple permits determination of which one is the reducing agent and which one is the oxidising agent. The strength of reducing or oxidising agents can be determined from their standard reduction ($E_{red}^0$) or oxidation ($E_{ox}^0$) potentials.

Onium salts have been widely used in cationically curable formulations. Extensive investigation into the use of onium salts as photoinitiators for cationic polymerisation led to the realisation that during the course of the photochemical reaction the onium cation undergoes photochemical reduction. In particular, diaryliodonium salts have been used in cationically curable formulations. Extensive investigation into the use of diaryliodonium salts (1) as photoinitiators for cationic polymerisation led to the realisation that during the course of the photochemical reaction iodine undergoes a reduction in oxidation state from +3 to +1.

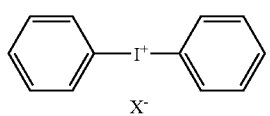

(1)

Crivello et al. (J. V. Crivello and J. H. W. Lam, *J. Polym. Sci.*, 1981, 19, 539-548) propose that the action of light on the diaryliodonium salt liberates radical intermediates, see Scheme 1. A resulting cascading series of reactions results in reduction of the oxidation state of iodine in the diaryliodonium salt. The aryliodine cation radicals generated during the photolysis process are extremely reactive species and react with solvents, monomers, or impurities (denoted SH in the scheme) to produce a protonic acid. The protonic acid in turn reacts with the cationically curable monomer resulting in polymerisation.

Scheme 1

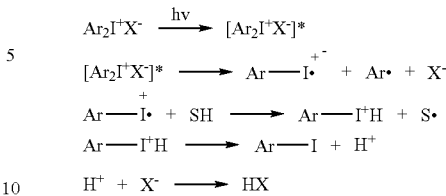

Diaryliodonium salts as initiators of cationic polymerisation via RedOx type chemistry have also been the subject of investigation. The general premise here was that, in the presence of a chemical reducing agent, the iodine component of the diaryliodonium salt could be reduced resulting in the generation of the protonic acid species HX, as shown in Scheme 2 (below), which will in turn initiate cationic polymerisation.

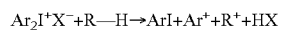 Scheme 2

Diaryliodonium salt/reducing agent couples incorporating ascorbic acid have been developed (J. V. Crivello and J. H. W. Lam, *J. Polym. Sci.*, 1981, 19, 539-548), benzoin (J. V. Crivello and J. L. Lee, *J. Polym. Sci*, 1983, 21, 1097-1110), and as have those incorporating tin (J. V. Crivello and J. L. Lee, *Makromol. Chem.*, 1983, 184, 463-473). Direct reduction of the iodonium salt (an onium salt) by the reducing agent is extremely inefficient. Consequently, there is the need to incorporate a copper catalyst in order to achieve efficient polymerization. Thus, such RedOx cationic initiation packages are effectively three component systems—the salt, the reducing agent and the catalyst.

The so described RedOx systems thus suffer from the drawback that direct reduction of the "onium" salt by the reducing agent is highly inefficient. Copper salts were required for efficient electron transfer. However, even in the absence of a catalyst very slow electron transfer between the reducing agent and the onium salt is observable rendering compositions having reducing agent and onium salt together in a composition inappropriate for long-term storage. There is thus still an unsatisfied need for suitable curable formulations which provide alternatives to the conventional onium formulations set out above.

Lewis Acid Metallic Salts as Initiators for Cationic Polymerisation:

Lewis acids in the form of metal salts have been used as initiators of cationic polymerization (Collomb, J. et al.; *Eur. Poly. J.*, 1980, 16, 1135-1144; Collomb, J.; Gandini, A.; Cheradamme, H.; *Macromol. Chem. Rapid Commun.*, 1980, 1, 489-491). Many strong Lewis acid initiators have been shown to function by the direct initiation of the monomer (Scheme 3) (Collomb, J.; Gandini, A.; Cheradamme, H.; *Macromol. Chem. Rapid Commun.*, 1980, 1, 489-491). The stronger the Lewis acid the more pronounced is its initiating power.

Scheme 3

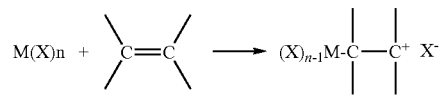

Not all Lewis acid metal salts react with cationically polymerizable monomers. Many can be formulated as the initiating component in storage stable one-component cationically polymerizable systems (Castell, P. et al.; *Polymer*, 2000, 41(24), 8465-8474). In these instances decomposition of the initiator and activation of polymerization is typically achieved by thermal or electromagnetic radiation curing processes (Castell, P. et al.; *Polymer*, 2000, 41(24), 8465-8474).

There is thus still an unsatisfied need for suitable curable formulations which provide alternatives to the conventional Lewis acid metal salt formulations set out above, which will cure in the absence of thermal or electromagnetic radiation curing processes.

SUMMARY OF THE INVENTION

The invention provides a stable one-part cationically curable composition for curing on a surface comprising:
(i) a cationically curable component;
(ii) an accelerator species comprising at least one vinyl ether functional group; and
(iii) an initiator component comprising at least one metal salt;
where the standard reduction potential of the initiator component is greater than the standard reduction potential of the surface, and
where when the composition is placed in contact with the surface, the metal salt of the initiator component of the composition is reduced at the surface, thereby initiating cure of the cationically curable component of the composition.

References to standard reduction potentials in this specification indicate the tendency of a species to acquire electrons and thereby be reduced. Standard reduction potentials are measured under standard conditions: 25° C., 1 M concentration, a pressure of 1 atm and elements in their pure state.

The accelerator species comprising at least one vinyl ether functional group greatly enhances the rate of cure. The accelerator species may embrace the following structures:

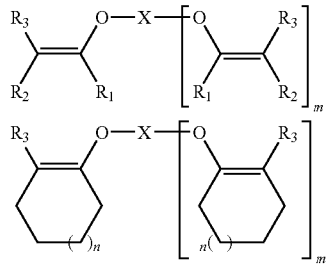

where
m can be 0 or 1;
n can be 0-5;
$R_1$, $R_2$, and $R_3$ can be the same or different and can be selected from hydrogen, $C_1$-$C_{20}$ alkyl chain (linear, branched or cyclic) and $C_5$-$C_{20}$ aryl moiety, and combinations thereof;
X can be a $C_1$-$C_{30}$ saturated or unsaturated, cyclic or acyclic moiety; and
$R_1$, $R_2$, $R_3$ and X may or may not independently contain ether linkages, sulfur linkages, carboxyl groups, and carbonyl groups.
X, $R_1$, $R_2$, and $R_3$ in the above formulae may comprise substituted variants and derivatives thereof, e.g. halogen substituted and heteroatom substituted.

Desirably, the vinyl ether component is selected from 1,4-butanediol divinyl ether, 1,4-butanediol vinyl ether, bis-(4-vinyl oxy butyl) adipate, ethyl-1-propenyl ether, bis-(4-vinyl oxy butyl) isophthalate, bis[4-(vinyloxy)butyl]succinate, bis [4-(vinyloxy)butyl]terephthalate, bis[[4-[(vinyloxy)methyl] cyclohexyl]methyl] isophthalate, bis[[4-[(vinyloxy)methyl] cyclohexyl]methyl]glutarate, tris(4-vinyloxybutyl) trimellitate, VEctomer™ 2020 (CAS No. 143477-70-7), and combinations thereof.

The accelerator component comprising the at least one vinyl ether functional group greatly accelerates the rate of cationic polymerization. The accelerator component may be present in 5-98% w/w of the total composition, for example 5-50% w/w of the total composition, desirably from 5-30% w/w of the total composition.

Desirably, the metal salt of the composition comprises a transition metal cation. Suitable metals include silver, copper and combinations thereof. The metal salt may be substituted with a ligand. The metal salt counterions may be chosen from $ClO_4^-$, $BF_4^-$, $PF_6^-$, $SbF_6^-$, $AsF_6^-$, $(C_6F_5)_4B$ anion, $(C_6F_5)_4$ Ga anion, Carborane anion, triflimide (trifluoromethanesulfonate) anion, bis-triflimide anion, anions based thereon and combinations thereof. Further desirably, the metal salt counterions may be chosen from $ClO_4^-$, $BF_4^-$, $PF_6^-$, $SbF_6^-$ and combinations thereof.

The solubility of the metal salt may be modified by changing the counterion, the addition and/or substitution of ligands to the metal of the metal salt and combinations thereof. This will allow for efficient electron transfer between the surface and the metal salt to be observed as appropriate solubility is achieved.

The cationically curable component desirably has at least one functional group selected from epoxy, vinyl, oxetane, thioxetane, episulfide, tetrahydrofuran, oxazoline, oxazine, lactone, trioxane, dioxane, styrene with combinations thereof also being embraced by the present invention. Further desirably, the cationically curable component has at least one functional group selected from epoxy, episulfide, oxetane, thioxetane, and combinations thereof. Preferably, the cationically curable component has at least one functional group selected from epoxy, oxetane and combinations thereof.

Desirably, the surfaces to which the compositions of the present invention are applied may comprise a metal, metal oxide or metal alloy. Further desirably, the surface may comprise a metal or metal oxide. Preferably, the surface may comprise a metal. Suitable surfaces can be selected from iron, steel, mild steel, gritblasted mild steel, aluminium, aluminium oxide, copper, zinc, zinc oxide, zinc bichromate, and stainless steel. References to aluminium and aluminium oxide include alclad aluminium (low copper content), and oxide removed alclad aluminium (low copper content) respectively. Desirably, the surface can be selected from steel and aluminium. Metal salts suitable for use in compositions for curing on steel or aluminium surfaces may be chosen from silver salts, copper salts and combinations thereof, and where the counterions of the silver and copper salts may be chosen from $ClO_4^-$, $BF_4^-$, $PF_6^-$, $SbF_6^-$ and combinations thereof.

The RedOx cationic systems discussed herein do not require any additional reducing agent. They are stable until applied to a substrate which is capable of participating in a RedOx reaction, thus fulfilling the role of a conventional reducing agent component. The compositions of the present invention can thus be utilized in any application in which curing on a metal surface is required. The compositions of the invention are storage stable even as a one-part composition and require no special packaging unlike prior art compositions, which tend to be multi-component compositions.

The compositions of the present invention do not require an additional catalyst for efficient curing. The present invention utilizes appropriate selection of the initiator component relative to the surface on which the composition is to be applied and cured. Thus surface promoted RedOx chemistry can be utilized to initiate cure in cationically curable compositions. However, it will be appreciated that compositions according to the invention may optionally comprise a catalyst to affect electron transfer between the surface and the metal salt of the composition. This may be useful where even greater cure speeds are required. Suitable catalysts include transition metal salts.

The inventive compositions will generally be useful as adhesives, sealants or coatings, and can be used in a wide range of industrial applications including metal bonding, thread-locking, flange sealing, and structural bonding amongst others.

The inventive compositions may be encapsulated if it is desired to do so. Suitable encapsulation techniques comprise, but are not limited to, coacervation, softgel and co-extrusion.

Alternatively, the inventive compositions may be used in a pre-applied format. It will be appreciated that the term pre-applied is to be construed as taking the material in an encapsulated form (typically but not necessarily micro-encapsulated) and dispersing said capsules in a liquid binder system that can be dried (e.g. thermal removal of water or an organic solvent, or by photo-curing the binder) on the desired substrate. A film of material remains which contains the curable composition (for example adhesive liquid for example in the form of filled capsules). The curable composition can be released for cure by physically rupturing the material (for example capsules) when the user wishes to activate the composition, e.g. in pre-applied threadlocking adhesives the coated screw threaded part is activated by screwing together with its reciprocally threaded part for example a threaded receiver or nut.

The invention further extends to a process for bonding two substrates together comprising the steps of:
  (i) applying a composition comprising:
    i) a cationically curable component;
    ii) an accelerator species comprising at least one vinyl ether functional group; and
    iii) an initiator component comprising at least one metal; to at least one substrate, and
  (ii) mating the first and second substrates so as to form a bond with the composition,
where the standard reduction potential of the initiator component is greater than the standard reduction potential of at least one of the substrates.

In one particular embodiment, both substrates comprise a metal. Where the second substrate comprises a different metal substrate to the first metal substrate the composition of the invention may comprise more than one type of metal salt. Thus, the invention also provides for curable compositions wherein the inclusion of more than one type of metal salt can be used to bond different metal substrates together.

Desirably, the metal of the metal salt of the inventive compositions of the present invention is lower in the reactivity series than the metal surface on which it is to be cured.

Metallic substrates can also be bonded to non-metallic substrates. For instance mild steel may be bonded to e-coated steel (e-coat is an organic paint which is electrodeposited, with an electrical current, to a metallic surface, such as steel).

Moreover, the inventive compositions of the present invention can be utilised to form (polymeric) coatings on parts, for example on metallic parts.

The invention also relates to a pack comprising:
  a) a container; and
  b) a cationically curable composition according to the present invention,
where the container may be air permeable. Alternatively, the container may not air permeable.

DETAILED DESCRIPTION OF THE INVENTION

The electrochemical series is a measure of the oxidising and reducing power of a substance based on its standard potential. The standard potential of a substance is measure relative to the hydrogen electrode.

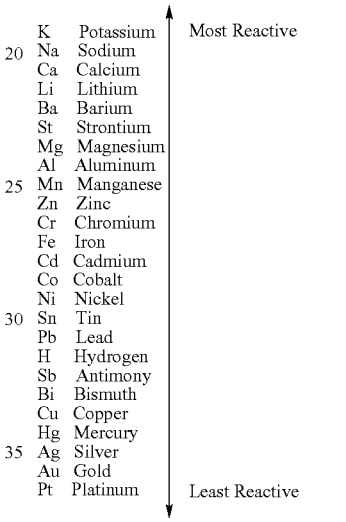

Scheme 4

| K | Potassium | Most Reactive |
| Na | Sodium | |
| Ca | Calcium | |
| Li | Lithium | |
| Ba | Barium | |
| St | Strontium | |
| Mg | Magnesium | |
| Al | Aluminum | |
| Mn | Manganese | |
| Zn | Zinc | |
| Cr | Chromium | |
| Fe | Iron | |
| Cd | Cadmium | |
| Co | Cobalt | |
| Ni | Nickel | |
| Sn | Tin | |
| Pb | Lead | |
| H | Hydrogen | |
| Sb | Antimony | |
| Bi | Bismuth | |
| Cu | Copper | |
| Hg | Mercury | |
| Ag | Silver | |
| Au | Gold | |
| Pt | Platinum | Least Reactive |

A metal with a negative standard potential has a thermodynamic tendency to reduce hydrogen ions in solution, whereas the ions of a metal with a positive standard potential have a tendency to be reduced by hydrogen gas. The reactivity series, shown in Scheme 4 (above), is an extension of the electrochemical series.

Ordinarily, only a metal or element positioned higher in the reactivity series can reduce another metal or element that is lower down in the reactivity series e.g. Iron can reduce Tin but not Potassium. It is appreciated that the order of the reactivity series can be (changed) inverted from that shown in Scheme 4. The terms "higher" and "lower" will be understood however as referring to a reactivity series having at the most reactive at the top and the least reactive at the bottom. In any event in the context of the present invention it will be appreciated that the metal of the metal salt is chosen so that it is reducible at the surface to which it is applied.

EXAMPLES

General Procedure for Preparation of Formulations

To a quantity of monomer was added a quantity of initiator salt and a quantity of accelerator. The salt was thoroughly dissolved in the monomer by continuous stirring (16 hours) at room temperature. All samples were kept covered to exclude light during preparation and while in storage.

General Procedure for Testing Formulations:

A standard test method was followed for testing all adhesive formulations based on ASTM E177 and ASTM E6.

Apparatus

Tension testing machine, equipped with a suitable load cell.

Test Specimens

Lap-shear specimens, as specified in the quality specification, product or test program.

Assembly Procedure
1. Five test specimens were used for each test.
2. Specimen surface was prepared where necessary, i.e. mild steel lap-shears are grit blasted with silicon carbide.
3. Test specimens were cleaned by wiping with acetone or isopropanol before assembly.
4. Bond area on each lap-shear was 322.6 mm$^2$ or 0.5 in$^2$. This is marked before applying the adhesive sample.
5. A sufficient quantity of adhesive was applied to the prepared surface of one lap-shear.
6. A second lap-shear was placed onto the adhesive and the assembly was clamped on each side of the bond area.

Test Procedure

After allowing for cure as specified in test program the shear strength was determined as follows:
1. The test specimen was placed in the grips of the testing machine so that the outer 25.4 mm (1 in.) of each end were grasped be the jaws. The long axis of the test specimen coincided with the direction of applied tensile force through the centre line of the grip assembly.
2. The assembly was tested at a crosshead speed of 2.0 mm/min or 0.05 in./min., unless otherwise specified.
3. The load at failure was recorded.

The Following Information was Recorded:
1. Identification of the adhesive including name or number, and lot number.
2. Identification of the test specimens used including substrate and dimensions.
3. Surface preparation used to prepare the test specimens.
4. Cure conditions (Typically ambient room temperature only, 20-25° C.).
5. Test Conditions (Standard Temperature and Pressure i.e. Room temperature).
6. Environmental conditioning, if any (None, all substrates to be bonded are freshly prepared before use).
7. Number of specimens tested, if other than 5 (Typically an average of 5 results for each quoted result).
8. Results for each specimen.
9. Average shear strength for all replicates.
10. Failure mode for each specimen when required by the quality specification, product profile, or test program.
11. Any deviation from this method.

Example 1

Control A

Diphenyliodonium PF$_6$ (0.20 g, 0.43 mmol) was dissolved in the cycloaliphatic diepoxide monomer Cyracure 6110, 3,4-epoxycyclohexylmethyl-3,4-epoxycyclohexane carboxylate, (8.0 g) and the accelerator 1,4-butanediol divinyl ether (2.0 g).

Adhesive performance following 24 hr at 25° C. on:
Grit Blasted Mild Steel Lapshears: No Cure
Glass Lapshears No Cure

Example 2

Control B

[Ag(1,5-Cyclooctadiene)$_2$] SbF$_6$ (0.24 g, 0.43 mmol) was dissolved in the cycloaliphatic monomer Cyracure 6110 (10 g, 40 mmol).

Adhesive performance following 24 hr at 25° C. on:
Grit Blasted Mild Steel Lapshears: 4 N/mm$^2$

Example 3

[Ag(1,5-Cyclooctadiene)$_2$] SbF$_6$ (0.24 g, 0.43 mmol) was dissolved in the cycloaliphatic diepoxide monomer Cyracure 6110, 3,4-epoxycyclohexylmethyl-3,4-epoxycyclohexane carboxylate, (8.0 g) and the accelerator 1,4-butanediol divinyl ether (2.0 g).

Adhesive performance following 24 hr at 25° C. on:
Grit Blasted Mild Steel Lapshears: 20 N/mm$^2$
Plain Mild Steel Lapshears: 7 N/mm$^2$
Alclad Aluminium (Low Copper Content) 2.5 N/mm$^2$
Alclad Aluminium (Oxide Removed) 5.0 N/mm$^2$
Standard Aluminium 10 N/mm$^2$
Copper 5.2 N/mm$^2$
Stainless Steel 6.2 N/mm$^2$
Zinc Bichromate 5.0 N/mm$^2$
E-Coated Steel to Grit Blasted Mild Steel Lapshears: 20 N/mm$^2$
Glass Lapshears No Cure
Adhesive performance following 4 hr at 25° C. on:
Grit Blasted Mild Steel Lapshears: 9 N/mm$^2$

Example 3a

[Ag(1,5-Cyclooctadiene)$_2$] SbF$_6$ (0.12 g, 0.215 mmol) was dissolved in the cycloaliphatic diepoxide monomer Cyracure 6110, 3,4-epoxycyclohexylmethyl-3,4-epoxycyclohexane carboxylate, (8.0 g) and the accelerator 1,4-butanediol divinyl ether (2.0 g).

Adhesive performance following 24 hr at 25° C. on:
Grit Blasted Mild Steel Lapshears: 20 N/mm$^2$
Adhesive performance following 4 hr at 25° C. on:
Grit Blasted Mild Steel Lapshears: 9 N/mm$^2$ Accelerators and Accelerator Concentrations

Example 4

[Ag(1,5-Cyclooctadiene)$_2$] SbF$_6$ (0.24 g, 0.43 mmol) was dissolved in the cycloaliphatic diepoxide monomer Cyracure 6110, 3,4-epoxycyclohexylmethyl-3,4-epoxycyclohexane carboxylate, (8.0 g) and the accelerator 1,4-butanediol vinyl ether (2.0 g).

Adhesive performance following 24 hr at 25° C. on:
Grit Blasted Mild Steel Lapshears: 5 N/mm$^2$

Example 5

[Ag(1,5-Cyclooctadiene)$_2$] SbF$_6$ (0.24 g, 0.43 mmol) was dissolved in the cycloaliphatic diepoxide monomer Cyracure 6110, 3,4-epoxycyclohexylmethyl-3,4-epoxycyclohexane carboxylate, (9.5 g) and the accelerator 1,4-butanediol vinyl ether (0.5 g).

Adhesive performance following 24 hr at 25° C. on:
Grit Blasted Mild Steel Lapshears: 20 N/mm$^2$

Example 6

[Ag(1,5-Cyclooctadiene)$_2$] SbF$_6$ (0.24 g, 0.43 mmol) was dissolved in the cycloaliphatic diepoxide monomer Cyracure 6110, 3,4-epoxycyclohexylmethyl-3,4-epoxycyclohexane carboxylate, (8.0 g) and the accelerator VEctomer™ 4060: bis-(4-vinyl oxy butyl) adipate {CAS No. 135876-36-7} (2.0 g).
  Adhesive performance following 24 hr at 25° C. on:
  Grit Blasted Mild Steel Lapshears: 12 N/mm$^2$ Example 7

[Ag(1,5-Cyclooctadiene)$_2$] SbF$_6$ (0.24 g, 0.43 mmol) was dissolved in the cycloaliphatic diepoxide monomer Cyracure 6110, 3,4-epoxycyclohexylmethyl-3,4-epoxycyclohexane carboxylate, (9.5 g) and the accelerator VEctomer™ 4060: bis-(4-vinyl oxy butyl) adipate {CAS No. 135876-36-7} (0.5 g). Adhesive performance following 24 hr at 25° C. on:
  Grit Blasted Mild Steel Lapshears: 15 N/mm$^2$ Example 8

[Ag(1,5-Cyclooctadiene)$_2$] SbF$_6$ (0.24 g, 0.43 mmol) was dissolved in the accelerator VEctomer™ 4060: bis-(4-vinyl oxy butyl) adipate {CAS No. 135876-36-7} (10.0 g).
  Adhesive performance following 24 hr at 25° C. on:
  Grit Blasted Mild Steel Lapshears: 7 N/mm$^2$ Example 9

[Ag(1,5-Cyclooctadiene)$_2$] SbF$_6$ (0.24 g, 0.43 mmol) was dissolved in the cycloaliphatic diepoxide monomer Cyracure 6110, 3,4-epoxycyclohexylmethyl-3,4-epoxycyclohexane carboxylate, (8.0 g) and the accelerator 1,4-butanediol divinyl ether (2.0 g).
  Adhesive performance following 24 hr at 25° C. on:
  Grit Blasted Mild Steel Lapshears: 20 N/mm$^2$ Example 10

[Ag(1,5-Cyclooctadiene)$_2$] SbF$_6$ (0.24 g, 0.43 mmol) was dissolved in the cycloaliphatic diepoxide monomer Cyracure 6110, 3,4-epoxycyclohexylmethyl-3,4-epoxycyclohexane carboxylate, (9.5 g) and the accelerator 1,4-butanediol divinyl ether (0.5 g).
  Adhesive performance following 24 hr at 25° C. on:
  Grit Blasted Mild Steel Lapshears: 20 N/mm$^2$ Example 11

[Ag(1,5-Cyclooctadiene)$_2$] SbF$_6$ (0.24 g, 0.43 mmol) was dissolved in the cycloaliphatic diepoxide monomer Cyracure 6110, 3,4-epoxycyclohexylmethyl-3,4-epoxycyclohexane carboxylate, (8.0 g) and the accelerator ethyl-1-propenyl ether, mixture of cis and trans (2.0 g).
  Adhesive performance following 24 hr at 25° C. on:
  Grit Blasted Mild Steel Lapshears: 18 N/mm$^2$ Example 12

[Ag(1,5-Cyclooctadiene)$_2$] SbF$_6$ (0.24 g, 0.43 mmol) was dissolved in the cycloaliphatic diepoxide monomer Cyracure 6110, 3,4-epoxycyclohexylmethyl-3,4-epoxycyclohexane carboxylate, (9.5 g) and the accelerator ethyl-1-propenyl ether, mixture of cis and trans (0.5 g).
  Adhesive performance following 24 hr at 25° C. on:
  Grit Blasted Mild Steel Lapshears: 18 N/mm$^2$ Example 13

[Ag(1,5-Cyclooctadiene)$_2$] SbF$_6$ (0.24 g, 0.43 mmol) was dissolved in the cycloaliphatic diepoxide monomer Cyracure 6110, 3,4-epoxycyclohexylmethyl-3,4-epoxycyclohexane carboxylate, (8.0 g) and the accelerator VEctomer™ 4010: bis-(4-vinyl oxy butyl) isophthalate {CAS No. 130066-57-8} (2.0 g).
  Adhesive performance following 24 hr at 25° C. on:
  Grit Blasted Mild Steel Lapshears: 9 N/mm$^2$ Example 14

[Ag(1,5-Cyclooctadiene)$_2$] SbF$_6$ (0.24 g, 0.43 mmol) was dissolved in the cycloaliphatic diepoxide monomer Cyracure 6110, 3,4-epoxycyclohexylmethyl-3,4-epoxycyclohexane carboxylate, (9.5 g) and the accelerator VEctomer™ 4010: bis-(4-vinyl oxy butyl) isophthalate {CAS No. 130066-57-8} (0.5 g).
  Adhesive performance following 24 hr at 25° C. on:
  Grit Blasted Mild Steel Lapshears: 18 N/mm$^2$ Example 15

[Ag(1,5-Cyclooctadiene)$_2$] SbF$_6$ (0.24 g, 0.43 mmol) was dissolved in the accelerator VEctomer™ 4010: bis-(4-vinyl oxy butyl) isophthalate {CAS No. 130066-57-8} (10.0 g).
  Adhesive performance following 24 hr at 25° C. on:
  Grit Blasted Mild Steel Lapshears: 15 N/mm$^2$ Example 16

[Ag(1,5-Cyclooctadiene)$_2$] SbF$_6$ (0.24 g, 0.43 mmol) was dissolved in the cycloaliphatic diepoxide monomer Cyracure 6110, 3,4-epoxycyclohexylmethyl-3,4-epoxycyclohexane carboxylate, (8.0 g) and the accelerator VEctomer™ 4030; bis[4-(vinyloxy)butyl] succinate {CAS No. 135876-32-3} (2.0 g).
  Adhesive performance following 24 hr at 25° C. on:
  Grit Blasted Mild Steel Lapshears: 23 N/mm$^2$ Example 17

[Ag(1,5-Cyclooctadiene)$_2$] SbF$_6$ (0.24 g, 0.43 mmol) was dissolved in the cycloaliphatic diepoxide monomer Cyracure 6110, 3,4-epoxycyclohexylmethyl-3,4-epoxycyclohexane carboxylate, (9.5 g) and the accelerator VEctomer™ 4030: bis[4-(vinyloxy)butyl] succinate {CAS No. 135876-32-3} (0.5 g).
  Adhesive performance following 24 hr at 25° C. on:
  Grit Blasted Mild Steel Lapshears: 11 N/mm$^2$ Example 18

[Ag(1,5-Cyclooctadiene)$_2$] SbF$_6$ (0.24 g, 0.43 mmol) was dissolved in the accelerator VEctomer™ 4030; bis[4-(vinyloxy)butyl]succinate {CAS No. 135876-32-3} (10.0 g).
  Adhesive performance following 24 hr at 25° C. on:
  Grit Blasted Mild Steel Lapshears: 10 N/mm$^2$ Example 19

[Ag(1,5-Cyclooctadiene)$_2$] SbF$_6$ (0.24 g, 0.43 mmol) was dissolved in the cycloaliphatic diepoxide monomer Cyracure 6110, 3,4-epoxycyclohexylmethyl-3,4-epoxycyclohexane carboxylate, (8.0 g) and the accelerator VEctomer™ 4050: bis[4-(vinyloxy)butyl]terephthalate {CAS No. 117397-31-6} (2.0 g).
  Adhesive performance following 24 hr at 25° C. on:
  Grit Blasted Mild Steel Lapshears: 11 N/mm$^2$

Example 20

[Ag(1,5-Cyclooctadiene)$_2$] SbF$_6$ (0.24 g, 0.43 mmol) was dissolved in the cycloaliphatic diepoxide monomer Cyracure 6110, 3,4-epoxycyclohexylmethyl-3,4-epoxycyclohexane carboxylate, (9.5 g) and the accelerator VEctomer™ 4050: bis[4-(vinyloxy)butyl]terephthalate {CAS No. 117397-31-6} (0.5 g).
Adhesive performance following 24 hr at 25° C. on:
Grit Blasted Mild Steel Lapshears: 12 N/mm$^2$

Example 21

[Ag(1,5-Cyclooctadiene)$_2$] SbF$_6$ 6 (0.24 g, 0.43 mmol) was dissolved in the cycloaliphatic diepoxide monomer Cyracure 6110, 3,4-epoxycyclohexylmethyl-3,4-epoxycyclohexane carboxylate, (8.0 g) and the accelerator VEctomer™ 4040: bis[[4-[(vinyloxy)methyl]cyclohexyl]methyl] isophthalate {CAS No. 119581-93-0} (2.0 g).
Adhesive performance following 24 hr at 25° C. on:
Grit Blasted Mild Steel Lapshears: 2 N/mm$^2$

Example 22

[Ag(1,5-Cyclooctadiene)$_2$] SbF$_6$ (0.24 g, 0.43 mmol) was dissolved in the cycloaliphatic diepoxide monomer Cyracure 6110, 3,4-epoxycyclohexylmethyl-3,4-epoxycyclohexane carboxylate, (9.5 g) and the accelerator VEctomer™ 4040: bis[[4-[(vinyloxy)methyl]cyclohexyl]methyl] isophthalate {CAS No. 119581-93-0} (0.5 g).
Adhesive performance following 24 hr at 25° C. on:
Grit Blasted Mild Steel Lapshears: 4 N/mm$^2$

Example 23

[Ag(1,5-Cyclooctadiene)$_2$] SbF$_6$ (0.24 g, 0.43 mmol) was dissolved in the cycloaliphatic diepoxide monomer Cyracure 6110, 3,4-epoxycyclohexylmethyl-3,4-epoxycyclohexane carboxylate, (8.0 g) and the accelerator VEctomer™ 4020: bis[4-(vinyloxymethyl)cyclohexylmethyl] glutarate {CAS No. 131132-77-9} (2.0 g).
Adhesive performance following 24 hr at 25° C. on:
Grit Blasted Mild Steel Lapshears: 3 N/mm$^2$

Example 24

[Ag(1,5-Cyclooctadiene)$_2$] SbF$_6$ (0.24 g, 0.43 mmol) was dissolved in the cycloaliphatic diepoxide monomer Cyracure 6110, 3,4-epoxycyclohexylmethyl-3,4-epoxycyclohexane carboxylate, (9.5 g) and the accelerator VEctomer™ 4020: bis[4-(vinyloxymethyl)cyclohexylmethyl] glutarate {CAS No. 131132-77-9} (0.5 g).
Adhesive performance following 24 hr at 25° C. on:
Grit Blasted Mild Steel Lapshears: 5 N/mm$^2$

Example 25

[Ag(1,5-Cyclooctadiene)$_2$] SbF$_6$ (0.24 g, 0.43 mmol) was dissolved in the accelerator VEctomer™ 4020: bis[4-(vinyloxymethyl)cyclohexylmethyl]glutarate {CAS No. 131132-77-9} (10.0 g).
Adhesive performance following 24 hr at 25° C. on:
Grit Blasted Mild Steel Lapshears: 13 N/mm$^2$

Example 26

[Ag(1,5-Cyclooctadiene)$_2$] SbF$_6$ (0.24 g, 0.43 mmol) was dissolved in the cycloaliphatic diepoxide monomer Cyracure 6110, 3,4-epoxycyclohexylmethyl-3,4-epoxycyclohexane carboxylate, (8.0 g) and the accelerator VEctomer™ 5015: tris(4-vinyloxybutyl)trimellitate {CAS No. 196109-17-8} (2.0 g).
Adhesive performance following 24 hr at 25° C. on:
Grit Blasted Mild Steel Lapshears: 16 N/mm$^2$

Example 27

[Ag(1,5-Cyclooctadiene)$_2$] SbF$_8$ (0.24 g, 0.43 mmol) was dissolved in the cycloaliphatic diepoxide monomer Cyracure 6110, 3,4-epoxycyclohexylmethyl-3,4-epoxycyclohexane carboxylate, (9.5 g) and the accelerator VEctomer™ 5015: tris(4-vinyloxybutyl)trimellitate {CAS No. 196109-17-8} (0.5 g).
Adhesive performance following 24 hr at 25° C. on:
Grit Blasted Mild Steel Lapshears: 12 N/mm$^2$

Example 28

[Ag(1,5-Cyclooctadiene)$_2$] SbF$_6$ (0.24 g, 0.43 mmol) was dissolved in the accelerator VEctomer™ 5015: tris(4-vinyloxybutyl)trimellitate {CAS No. 196109-17-8} (10.0 g).
Adhesive performance following 24 hr at 25° C. on:
Grit Blasted Mild Steel Lapshears: 12 N/mm$^2$

Example 29

[Ag(1,5-Cyclooctadiene)$_2$] SbF$_6$ (0.24 g, 0.43 mmol) was dissolved in the cycloaliphatic diepoxide monomer Cyracure 6110, 3,4-epoxycyclohexylmethyl-3,4-epoxycyclohexane carboxylate, (9.5 g) and the accelerator VEctomer™ 2020: aliphatic urethane divinyl ether oligomer {CAS No. 143477-70-7} (0.5 g).
Adhesive performance following 72 hr at 25° C. on:
Grit Blasted Mild Steel Lapshears: 6 N/mm$^2$ Monomer Component

Example 30

[Ag(1,5-Cyclooctadiene)$_2$] SbF$_6$ (0.24 g, 0.43 mmol) was dissolved in the cycloaliphatic resin bis(3,4 epoxy cyclohexyl methyl) adipate Cyracure UVR 6128, (8.0 g) and the accelerator 1,4-butanediol divinyl ether (2.0 g).
Adhesive performance following 24 hr at 25° C. on:
Grit Blasted Mild Steel Lapshears: 20 N/mm$^2$

Example 31

[Ag(1,5-Cyclooctadiene)$_2$] SbF$_6$ (0.24 g, 0.43 mmol) was dissolved in the alicyclic epoxy resin Cyracure UCB CAT-002, (8.0 g) and the accelerator 1,4-butanediol divinyl ether (2.0 g).
Adhesive performance following 24 hr at 25° C. on:
Grit Blasted Mild Steel Lapshears: 20 N/mm$^2$

Example 32

[Ag(1,5-Cyclooctadiene)$_2$] SbF$_8$ (0.24 g, 0.43 mmol) was dissolved in the cycloaliphatic resin PC 1000 (from PolySet), (8.0 g) and the accelerator 1,4-butanediol divinyl ether (2.0 g).
Adhesive performance following 24 hr at 25° C. on:
Grit Blasted Mild Steel Lapshears: 9.0 N/mm$^2$

Example 33

[Ag(1,5-Cyclooctadiene)$_2$] SbF$_6$ (0.24 g, 0.43 mmol) was dissolved in epichlorohydrin-4,4'-isopropylidine diphenol resin, Araldite GY 266, (8.0 g) and the accelerator 1,4-butanediol divinyl ether (2.0 g).
Adhesive performance following 24 hr at 25° C. on:
Grit Blasted Mild Steel Lapshears: 26 N/mm$^2$

Example 34

[Ag(1,5-Cyclooctadiene)$_2$] SbF$_6$ (0.24 g, 0.43 mmol) was dissolved in the cycloaliphatic diepoxide monomer Cyracure 6110, 3,4-epoxycyclohexylmethyl-3,4-epoxycyclohexane carboxylate, (6.0 g), OXT-101, 3-ethyl-3-hydroxymethyl-oxetane (2.0 g), and the accelerator 1,4-butanediol divinyl ether (2.0 g).
Adhesive performance following 24 hr at 25° C. on:
Grit Blasted Mild Steel Lapshears: 20 N/mm$^2$

Example 35

[Ag(1,5-Cyclooctadiene)$_2$] SbF$_6$ (0.24 g, 0.43 mmol) was dissolved in the cycloaliphatic diepoxide monomer Cyracure 6110, 3,4-epoxycyclohexylmethyl-3,4-epoxycyclohexane carboxylate, (6.0 g), OXT-121, 1,4-bis[3-ethyl-3-oxetanylmethoxy)methyl]benzene (2.0 g), and the accelerator 1,4-butanediol divinyl ether (2.0 g).
Adhesive performance following 24 hr at 25° C. on:
Grit Blasted Mild Steel Lapshears: 20 N/mm$^2$

Example 36

[Ag(1,5-Cyclooctadiene)$_2$] SbF$_6$ (0.24 g, 0.43 mmol) was dissolved in the cycloaliphatic diepoxide monomer Cyracure 6110, 3,4-epoxycyclohexylmethyl-3,4-epoxycyclohexane carboxylate, (6.0 g), OXT-221, 3,3'-[oxybis(methylene)]bis (3-ethyl-oxetane) (2.0 g), and the accelerator 1,4-butanediol divinyl ether (2.0 g).
Adhesive performance following 24 hr at 25° C. on:
Grit Blasted Mild Steel Lapshears: 20 N/mm$^2$

Example 37

[Ag(1,5-Cyclooctadiene)$_2$] SbF$_6$ (0.24 g, 0.43 mmol) was dissolved in the cycloaliphatic diepoxide monomer Cyracure 6110, 3,4-epoxycyclohexylmethyl-3,4-epoxycyclohexane carboxylate, (6.0 g), OXT-212, 3-ethyl-3-[(2-ethylhexyloxy) methyl]oxetane (2.0 g), and the accelerator 1,4-butanediol divinyl ether (2.0 g).
Adhesive performance following 24 hr at 25° C. on:
Grit Blasted Mild Steel Lapshears: 20 N/mm$^2$
Metal Salts and Concentrations of Metal Salts

Example 38

[Ag(1,5-Hexadiene)$_2$] SbF6 (0.22 g, 0.43 mmol) was dissolved in the cycloaliphatic diepoxide monomer Cyracure 6110, 3,4-epoxycyclohexylmethyl-3,4-epoxycyclohexane carboxylate, (8.0 g) and the accelerator 1,4-butanediol divinyl ether (2.0 g).
Adhesive performance following 24 hr at 25° C. on:
Grit Blasted Mild Steel Lapshears: 20 N/mm$^2$

Example 39

[Ag(1,9-Decadiene)$_2$] SbF6 (0.26 g, 0.43 mmol) was dissolved in the cycloaliphatic diepoxide monomer Cyracure 6110, 3,4-epoxycyclohexylmethyl-3,4-epoxycyclohexane carboxylate, (8.0 g) and the accelerator 1,4-butanediol divinyl ether (2.0 g).
Adhesive performance following 24 hr at 25° C. on:
Grit Blasted Mild Steel Lapshears: 20 N/mm$^2$

Example 40

[Ag(1,7-octadiene)$_2$] SbF$_6$ (0.24 g, 0.43 mmol) was dissolved in the cycloaliphatic diepoxide monomer Cyracure 6110, 3,4-epoxycyclohexylmethyl-3,4-epoxycyclohexane carboxylate, (8.0 g) and the accelerator 1,4-butanediol divinyl ether (2.0 g).
Adhesive performance following 24 hr at 25° C. on:
Grit Blasted Mild Steel Lapshears: 20 N/mm$^2$

Example 41

[Ag(1,7-octadiene)$_2$] PF6 (0.20 g, 0.43 mmol) was dissolved in the cycloaliphatic diepoxide monomer Cyracure 6110, 3,4-epoxycyclohexylmethyl-3,4-epoxycyclohexane carboxylate, (8.0 g) and the accelerator 1,4-butanediol divinyl ether (2.0 g).
Adhesive performance following 24 hr at 25° C. on:
Grit Blasted Mild Steel Lapshears: 20 N/mm$^2$

Example 42

[Ag(1,7-octadiene)$_2$] BF$_4$ (0.18 g, 0.43 mmol) was dissolved in the cycloaliphatic diepoxide monomer Cyracure 6110, 3,4-epoxycyclohexylmethyl-3,4-epoxycyclohexane carboxylate, (8.0 g) and the accelerator 1,4-butanediol divinyl ether (2.0 g).
Adhesive performance following 24 hr at 25° C. on:
Grit Blasted Mild Steel Lapshears: 20 N/mm$^2$

Example 43

[Ag(1,7-octadiene)$_2$] ClO$_4$ (0.18 g, 0.43 mmol) was dissolved in the cycloaliphatic diepoxide monomer Cyracure 6110, 3,4-epoxycyclohexylmethyl-3,4-epoxycyclohexane carboxylate, (8.0 g) and the accelerator 1,4-butanediol divinyl ether (2.0 g).
Adhesive performance following 24 hr at 25° C. on:
Grit Blasted Mild Steel Lapshears: 20 N/mm$^2$

Example 44

[Ag(15-Crown-5)] SbF$_6$ (0.24 g, 0.43 mmol) was dissolved in the cycloaliphatic diepoxide monomer Cyracure 6110, 3,4-epoxycyclohexylmethyl-3,4-epoxycyclohexane carboxylate, (8.0 g) and the accelerator 1,4-butanediol divinyl ether (2.0 g).
Adhesive performance following 24 hr at 25° C. on:
Grit Blasted Mild Steel Lapshears: 20 N/mm$^2$

Example 45

[Ag(15-Crown-5)] SbF$_6$ (0.20 g, 0.43 mmol) was dissolved in the cycloaliphatic diepoxide monomer Cyracure 6110, 3,4-epoxycyclohexylmethyl-3,4-epoxycyclohexane carboxylate, (8.0 g) and the accelerator 1,4-butanediol divinyl ether (2.0 g).
Adhesive performance following 24 hr at 25° C. on:
Grit Blasted Mild Steel Lapshears: 20 N/mm$^2$

Example 46

[Ag(5-Crown-5)] BF$_4$ (0.18 μg 0.43 mmol) was dissolved in the cycloaliphatic diepoxide monomer Cyracure 6110, 3,4- epoxycyclohexylmethyl-3,4-epoxycyclohexane carboxylate, (8.0 g) and the accelerator 1,4-butanediol divinyl ether (2.0 g).

Adhesive performance following 24 hr at 25° C. on:
Grit Blasted Mild Steel Lapshears: 20 N/mm²

Example 47

[Ag(1,5-Cyclooctadiene)$_2$] PF$_6$ (0.22 g, 0.43 mmol) was dissolved in the cycloaliphatic diepoxide monomer Cyracure 6110, 3,4-epoxycyclohexylmethyl-3,4-epoxycyclohexane carboxylate, (8.0 g) and the accelerator 1,4-butanediol divinyl ether (2.0 g).

Adhesive performance following 24 hr at 25° C. on:
Grit Blasted Mild Steel Lapshears: 20 N/mm²

Example 48

[Ag(1,5-Cyclooctadiene)$_2$] BF$_4$ (0.18 g, 0.43 mmol) was dissolved in the cycloaliphatic diepoxide monomer Cyracure 6110, 3,4-epoxycyclohexylmethyl-3,4-epoxycyclohexane carboxylate, (8.0 g) and the accelerator 1,4-butanediol divinyl ether (2.0 g).

Adhesive performance following 24 hr at 25° C. on:
Grit Blasted Mild Steel Lapshears: 20 N/mm²

Example 49

[Ag(1,5-Cyclooctadiene)$_2$] ClO$_4$ (0.18 g, 0.43 mmol) was dissolved in the cycloaliphatic diepoxide monomer Cyracure 6110, 3,4-epoxycyclohexylmethyl-3,4-epoxycyclohexane carboxylate, (8.0 g) and the accelerator 1,4-butanediol divinyl ether (2.0 g).

Adhesive performance following 24 hr at 25° C. on:
Grit Blasted Mild Steel Lapshears: 20 N/mm²

Example 50

[Cu(1,5-Cyclooctadiene)$_2$] BF$_4$ (0.026 g, 0.07 mmol) and [Ag(1,5-Cyclooctadiene)$_2$] SbF$_6$ (0.20 g, 0.35 mmol) was dissolved in the cycloaliphatic diepoxide monomer Cyracure 6110, 3,4-epoxycyclohexylmethyl-3,4-epoxycyclohexane carboxylate, (8.0 g) and the accelerator 1,4-butanediol divinyl ether (2.0 g).

Adhesive performance following 4 hr at 25° C. on:
Grit Blasted Mild Steel Lapshears: 14 N/mm²

Example 51

[Cu(1,5-cyclooctadiene)$_2$] BF$_4$ (0.052 g, 0.14 mmol) and [Ag(1,5-cyclooctadiene)$_2$] SbF$_6$ (0.16 g, 0.28 mmol) was dissolved in the cycloaliphatic diepoxide monomer Cyracure 6110, 3,4-epoxycyclohexylmethyl-3,4-epoxycyclohexane carboxylate, (8.0 g) and the accelerator 1,4-butanediol divinyl ether (2.0 g).

Adhesive performance following 4 hr at 25° C. on:
Grit Blasted Mild Steel Lapshears: 13 N/mm²

Example 52

[Cu(1,5-cyclooctadiene)$_2$] BF$_4$ (0.08 g, 0.21 mmol) and [Ag(1,5-cyclooctadiene)$_2$] SbF$_6$ (0.12 g, 0.21 mmol) was dissolved in the cycloaliphatic diepoxide monomer Cyracure 6110, 3,4-epoxycyclohexylmethyl-3,4-epoxycyclohexane carboxylate, (8.0 g) and the accelerator 1,4-butanediol divinyl ether (2.0 g).

Adhesive performance following 4 hr at 25° C. on:
Grit Blasted Mild Steel Lapshears: 11.5 N/mm²

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. A cationically curable composition comprising:
   a. a cationically curable component;
   b. an accelerator species comprising at least one vinyl ether functional group; and
   c. an initiator component having a standard reduction potential, said initiator component comprising at least one metal salt wherein said metal salt is soluble in the cationically curable component and accelerator species;
   wherein the standard reduction potential of the initiator component is greater than the standard reduction potential of a substrate on which the cationically curable composition is to be applied,
   wherein when the composition is placed in contact with a surface of a substrate, the metal salt of the initiator component of the composition is reduced at the surface of the substrate, thereby initiating cure of the cationically curable component of the composition; and
   wherein the substrate is constructed from one of iron, steel, mild steel, gritblasted mild steel, aluminium, aluminium oxide, copper, zinc, zinc oxide, zinc bichromate, and stainless steel.

2. A curable composition according to claim 1, wherein the metal salt comprises a transition metal cation.

3. A curable composition according to claim 2, wherein the transition metal cation is selected from silver, copper and combinations thereof.

4. A curable composition according to claim 2, wherein the metal salt includes a counterion chosen from the group ClO$_4^-$, BF$_4^-$, PF$_6^-$, SbF$_6^-$, AsF$_6^-$, (C$_6$F$_5$)$_4$B, (C$_6$F$_5$)$_4$Ga, carborane, triflimide, bis-triflimide, and combinations thereof.

5. A curable composition according to claim 1, wherein the accelerator species comprising at least one vinyl ether functional group is of the general structure:

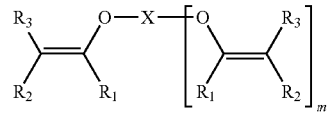

wherein m can be 0 or 1;
R$_1$, R$_2$, and R$_3$ can be the same or different and can be selected from the group consisting of hydrogen, C$_1$-C$_{20}$ alkyl chain (linear, branched or cyclic) and C$_5$-C$_{20}$ aryl moiety, and combinations thereof;
X can be a C$_1$-C$_{30}$ saturated or unsaturated, cyclic or acyclic moiety; and
R$_1$, R$_2$, R$_3$ and X may or may not independently contain ether linkages, sulfur linkages, carboxyl groups, and carbonyl groups.

6. A curable composition according to claim 1, wherein the accelerator species comprising at least one vinyl ether functional group is of the general structure:

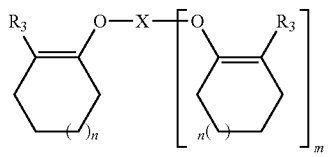

wherein m can be 0 or 1;
n can be 0-5;
$R_3$ can be selected from the group consisting of hydrogen, $C_1$-$C_{20}$ alkyl chain (linear, branched or cyclic) and $C_5$-$C_{20}$ aryl moiety and combinations thereof;
X can be a $C_1$-$C_{30}$ saturated or unsaturated, cyclic or acyclic moiety; and
$R_3$ and X may or may not independently contain ether linkages, amine linkages, sulfur linkages, carboxyl groups, and carbonyl groups.

7. A curable composition according to claim 1, wherein the accelerator species comprising at least one vinyl ether functional group component is selected from the group consisting of 1,4-Butanediol divinyl ether, 1,4-Butanediol vinyl ether, bis-(4-vinyl oxy butyl)adipate, Ethyl-1-propenyl ether, bis-(4-vinyl oxy butyl)isophthalate, Bis[4-(vinyloxy)butyl] succinate, Bis[4-(vinyloxy)butyl] terephthalate, Bis[[4-[(vinyloxy)methyl]cyclohexyl]methyl] isophthalate, Bis[[4-[(vinyloxy)methyl]cyclohexyl]methyl] glutarate, Tris(4-vinyloxybutyl)trimellitate, VEctomer™ 2020, and combinations thereof.

8. A curable composition according to claim 1, wherein the accelerator species comprising at least one vinyl ether functional group is present in 2-98% w/w of the total composition.

9. A curable composition according to claim 1, wherein the accelerator species comprising at least one vinyl ether functional group is present in 5-50% w/w of the total composition.

10. A curable composition according to claim 1, wherein the accelerator species comprising at least one vinyl ether functional group is present in 5-30% w/w of the total composition.

11. A curable composition according to claim 1, wherein the cationically curable component has at least one functional group selected from the group consisting of epoxy, vinyl, oxetane, thioxetane, episulfide, tetrahydrofuran, oxazoline, oxazine, lactone, trioxane, dioxane, styrene and combinations thereof.

12. A curable composition according to claim 1 further comprising a catalyst to effect electron transfer between the metal surface and the metal salt.

13. A curable composition according to claim 1 for adhering a first metallic substrate to another substrate.

14. A curable composition according to claim 1 for sealing.

15. A process of using the composition according to claim 1 in thread locking, flange sealing, structural bonding and/or metal bonding applications, steps of which comprise:
    (i) applying a composition comprising:
        i) a cationically curable component;
        ii) an accelerator species comprising at least one vinyl ether functional group; and
        iii) an initiator component having a standard reduction potential comprising at least one metal, to a surface of at least one substrate, and
    (ii) mating a first and a second substrate between facing surfaces so that the composition is disposed, wherein the standard reduction potential of the initiator component is greater than the standard reduction potential of at least one of the substrates.

16. A process for bonding two substrates together comprising applying the cationically curable composition of claim 1 to at least one substrate and mating the first and second substrates so as to form a bond with the composition, wherein the standard reduction potential of the initiator component is greater than the standard reduction potential of at least one of the substrates.

* * * * *